(12) United States Patent
Chang et al.

(10) Patent No.: US 8,131,736 B1
(45) Date of Patent: Mar. 6, 2012

(54) SYSTEM AND METHOD FOR NAVIGATING DOCUMENTS

(75) Inventors: Bay-Wei Chang, Foster City, CA (US); Eric Fredricksen, Seattle, WA (US)

(73) Assignee: Google Inc., Mountain View, CA (US)

( * ) Notice: Subject to any disclaimer, the term of this patent is extended or adjusted under 35 U.S.C. 154(b) by 256 days.

(21) Appl. No.: 12/324,267

(22) Filed: Nov. 26, 2008

Related U.S. Application Data

(63) Continuation of application No. 11/070,564, filed on Mar. 1, 2005, now abandoned.

(51) Int. Cl.
*G06F 17/30* (2006.01)

(52) U.S. Cl. .................................................. 707/751

(58) Field of Classification Search .................. 715/204; 709/217–224; 707/758, 751
See application file for complete search history.

(56) References Cited

U.S. PATENT DOCUMENTS

| | | | |
|---|---|---|---|
| 4,959,769 A | | 9/1990 | Cooper |
| 5,157,783 A | | 10/1992 | Anderson |
| 5,543,789 A | | 8/1996 | Behr |
| 5,781,785 A | | 7/1998 | Rowe |
| 5,933,841 A | * | 8/1999 | Schumacher et al. ......... 715/236 |
| 6,026,409 A | * | 2/2000 | Blumenthal ........................... 1/1 |
| 6,208,988 B1 | * | 3/2001 | Schultz .................................. 1/1 |
| 6,278,993 B1 | | 8/2001 | Kumar |
| 6,453,353 B1 | | 9/2002 | Win |
| 6,457,004 B1 | * | 9/2002 | Nishioka et al. ...................... 1/1 |
| 6,513,032 B1 | * | 1/2003 | Sutter ................................... 1/1 |
| 6,542,812 B1 | | 4/2003 | Obradovich |
| 6,665,658 B1 | * | 12/2003 | DaCosta et al. ....................... 1/1 |
| 6,963,867 B2 | | 11/2005 | Ford |
| 7,007,074 B2 | * | 2/2006 | Radwin .......................... 709/217 |
| 7,146,362 B2 | | 12/2006 | Allen |
| 7,162,686 B2 | | 1/2007 | Blazejewski |
| 7,277,881 B2 | * | 10/2007 | Imaichi et al. ........................ 1/1 |
| 2002/0184186 A1 | * | 12/2002 | Imaichi et al. ..................... 707/1 |
| 2003/0226104 A1 | | 12/2003 | Blazejewski |
| 2004/0205490 A1 | | 10/2004 | Haeuptle |
| 2004/0236726 A1 | * | 11/2004 | Ewing et al. ....................... 707/3 |
| 2006/0195797 A1 | * | 8/2006 | Yeung et al. ................... 715/811 |
| 2006/0241862 A1 | * | 10/2006 | Ichihara et al. ............... 701/209 |
| 2006/0265658 A1 | | 11/2006 | Forstall |
| 2007/0067317 A1 | * | 3/2007 | Stevenson ..................... 707/100 |
| 2007/0162443 A1 | | 7/2007 | Liu |

OTHER PUBLICATIONS

"Internet Explorer: Using the History List to return to Sites You've Visited," http://www.microsoft.com/windows/ie/using/howto/basics/history/button.mspx, 3 pages, Jan. 3, 2005.

Henry Lieberman, "Letizia: An Agent That Assists Web Browsing," Media Laboratory, Massachusetts Institute of Technology, http://lieber.www.media.mit.edu/people/lieber/Lieberary/Letizia-AAAI/Letizia.html, 9 pages, Jan. 28, 2005.

* cited by examiner

*Primary Examiner* — James Trujillo
*Assistant Examiner* — Jorge A Casanova
(74) *Attorney, Agent, or Firm* — Fish & Richardson P.C.

(57) ABSTRACT

Embodiments of this invention allow a user to navigate through previously viewed documents. These documents may be associated with a key, e.g. a search or a document. In response to re-entering the search or detecting subsequent interaction with the document, the navigation may be provided. In certain embodiments, the navigation is provided through a button on a toolbar or through a menu listing.

44 Claims, 15 Drawing Sheets

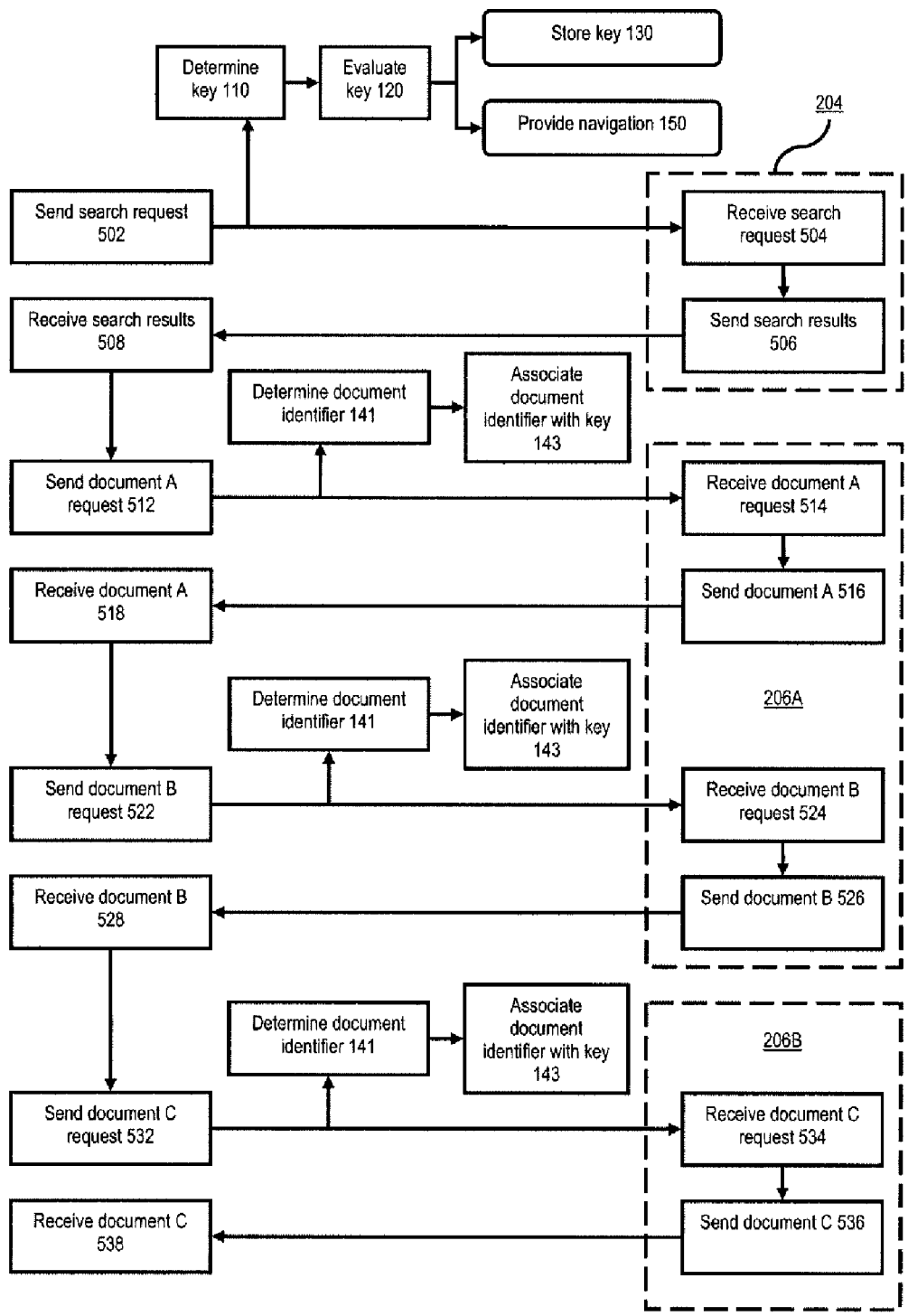

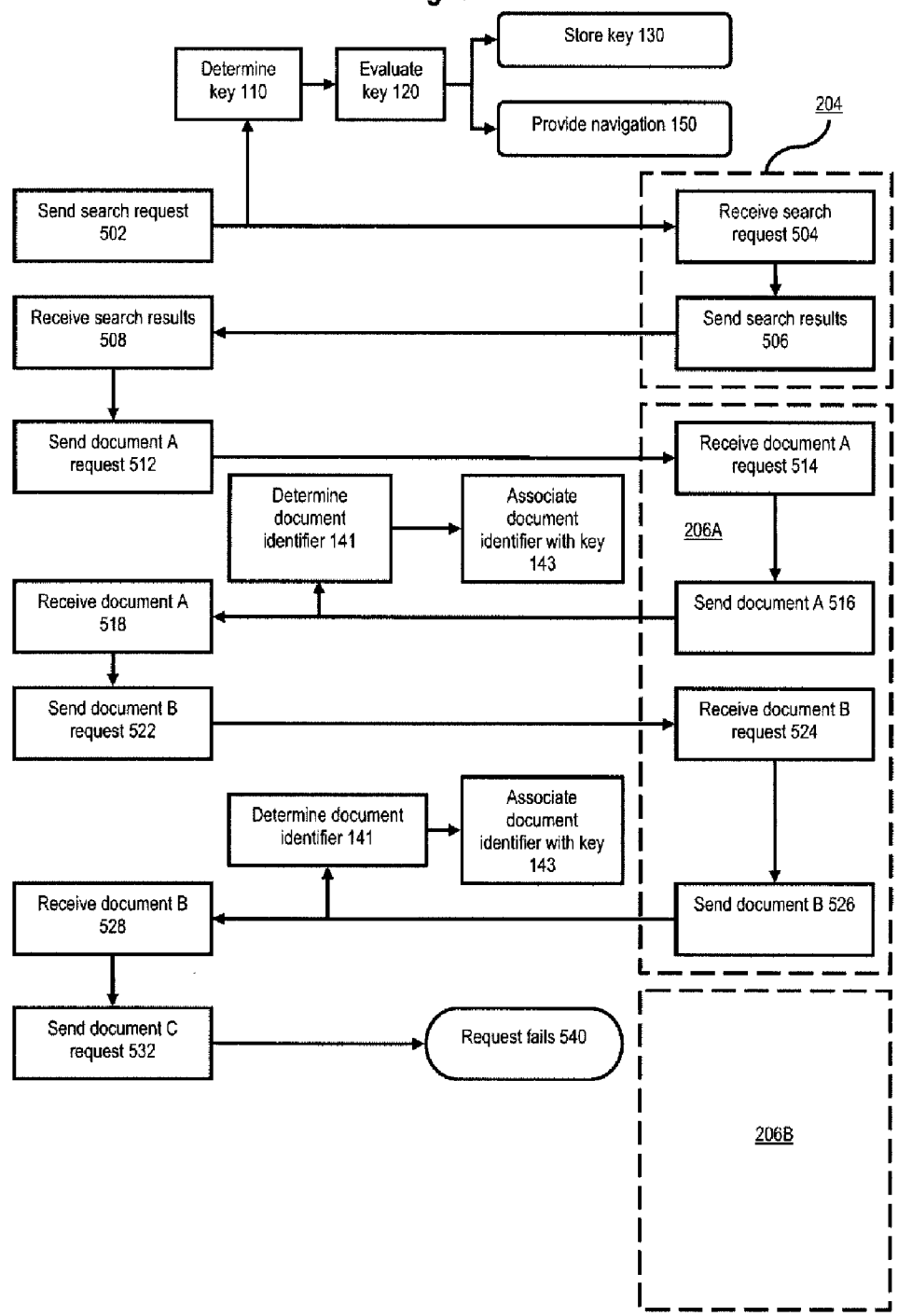

Fig. 10A

| Key | Navigation |
|---|---|
| Doc A | D, F, E, B, C |
|  |  |
|  |  |

Fig. 10B

| Key | Navigation |
|---|---|
| Doc A | F, E, D, C, B |
|  |  |
|  |  |

Fig. 10C

| Key | Navigation |
|---|---|
| Doc A | F, D, B, C, E |
|  |  |
|  |  |

Fig. 10D

| Key | Navigation |
|---|---|
| Doc B | C, A, D, E, F |
|  |  |
|  |  |

SYSTEM AND METHOD FOR NAVIGATING DOCUMENTS

CROSS-REFERENCE TO RELATED APPLICATIONS

This application is a continuation of U.S. application Ser. No. 11/070,564, filed Mar. 1, 2005, now pending which is incorporated by reference.

TECHNICAL FIELD

Embodiments of the present invention relate generally to the field of document navigation in computing and telecommunication systems, and in particular, to a system and method for navigating documents.

BACKGROUND

Document navigation generally includes locating and navigating to a first destination page, often via one or more intermediate pages. The navigation may include viewing the destination page and following links on the destination page to subsequent destination pages.

Search engines may help a user locate the first destination page by providing the user with a list of potentially relevant pages (e.g. a search results document). However, the user still selects the navigation path. For example, the user selects which of the search results to explore further. The user also selects which intermediate pages to navigate through to reach a destination page.

When the user later attempts to find the same destination page, the user may often rely on personal memory to repeat the navigation. This may lead to navigation through false paths or through previously traveled dead end paths. Thus, what is desired is an improved system and method for navigating to and/or through previously viewed documents.

BRIEF SUMMARY OF THE INVENTION

In accordance with one embodiment of the invention, a method may associate a navigation with a search. The method may include providing the navigation in response to re-entry of the search.

In accordance with another embodiment of the invention, a machine-readable medium may have stored thereon a set of instructions, which when executed, perform a method. The method may include associating one or more electronic data sites with a search. The method may further include providing an interface to navigate the one or more sites in response to re-entry of the search.

In accordance with another embodiment of the invention, a method may associate a navigation with a document. The method may include providing the navigation in response to subsequent interaction with the document.

BRIEF DESCRIPTION OF THE DRAWINGS

FIG. 5A illustrates a flow diagram associating viewed documents with a search key in accordance with one embodiment of the invention.

FIG. 5B illustrates a flow diagram associating viewed documents with a search key in accordance with another embodiment of the invention.

FIGS. 10A-10D illustrate tables listing various navigations associated with the documents of FIGS. 9A and 9B in accordance with various embodiment of the invention.

DETAILED DESCRIPTION

Embodiments of this invention provide a system and method for navigating to and/or through previously viewed documents. In certain embodiments, the navigation is associated with a search, e.g. via association with a search term. In other embodiments, the navigation is associated with a document, e.g. via association with a document locator (e.g., a uniform resource locator, a file/directory/network path) or other document identifier.

For example, in certain embodiments, a user may enter one or more keywords into a search engine. The user may then view several documents before arriving at a final document. The documents viewed by the user are tracked and associated with the search. If the user subsequently searches using the same or similar keyword(s), a tool is activated to allow the user to navigate to and/or through the viewed documents now associated with the search. The tool may be part of a graphical user interface (GUI). For example, the tool may be a button on a browser toolbar, e.g. the Google® toolbar. Therefore, in certain embodiments, one or more search terms may provide a key to an associated navigation.

In other embodiments, viewed documents are associated with a particular document, rather than a particular search. For example, a user may view a particular document, follow links to find more details on a particular topic, return to the particular document, and then follow other links. This navigation sequence may be tracked (e.g. by using cookies) and associated with the particular document. For example, the navigation sequence (or navigation) may be associated with a document title, uniform resource locator (URL), file/directory/network path or other similar document identifier. If a user re-visits the particular document, another tool may be provided to allow the user to repeat the navigation sequence now associated with the document. Therefore, in certain embodiments, a document, rather than a search, provides a key to an associated navigation.

Figure 1:
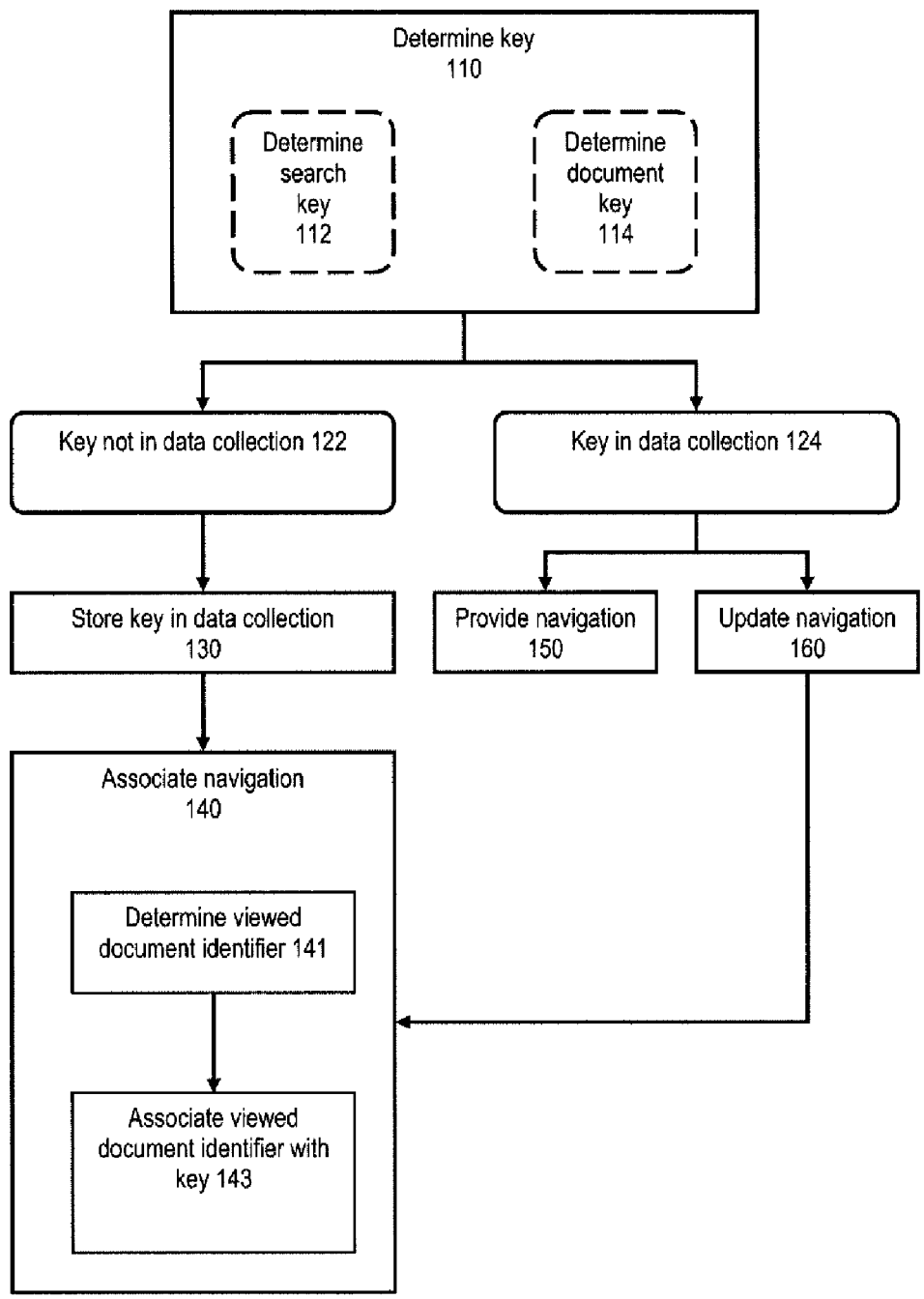
FIG. 1 illustrates a flow diagram of a system for associating and providing a previously executed navigation in accordance with one embodiment of the invention.

FIG. 1 illustrates a flow diagram of a system for associating and providing a previously executed navigation in accordance with one embodiment of the invention. In block 110, a key is determined. For example, in block 112, a search key is determined. This key may be, for example, a search term, a keyword, a query, or the like, as will be described in more detail below. Alternatively, in block 114, a document key is determined. This key may be, for example, a document title, document uniform resource locator (URL), file/directory/network path or other similar document identifier.

Once the key is determined in block 110, the key is evaluated to determine whether the key is in a data collection. If the key is not in the data collection, as shown in block 122, then the key is stored in the data collection. A navigation is then associated with the key, as shown in block 140. For example, an identifier for a viewed document may be determined, as shown in block 141. This document identifier may be a document URL or file path, for example. The document identifier may then be associated with the key, as shown in block 143. For example, the document identifier may be placed in the same table row as the key.

If the key is in the data collection, as shown in block 124, then a navigation associated with the key may be provided through a tool, as shown in block 150 and detailed further below. The navigation may also be updated, as shown in block 160. To update the navigation, a new navigation sequence may be associated with the key, as shown in block 140. The new navigation sequence may then be integrated into the currently associated navigation, such as by prefixing or appending the new sequence to the current navigation sequence.

The following provides variations and examples of various aspects of embodiments of the invention. It will be appreciated that the following variations and examples are not intended to be exhaustive or to limit the invention to the precise forms disclosed. These variations and examples are to provide further understanding of embodiments of the present invention.

System Architectures

Figure 2:
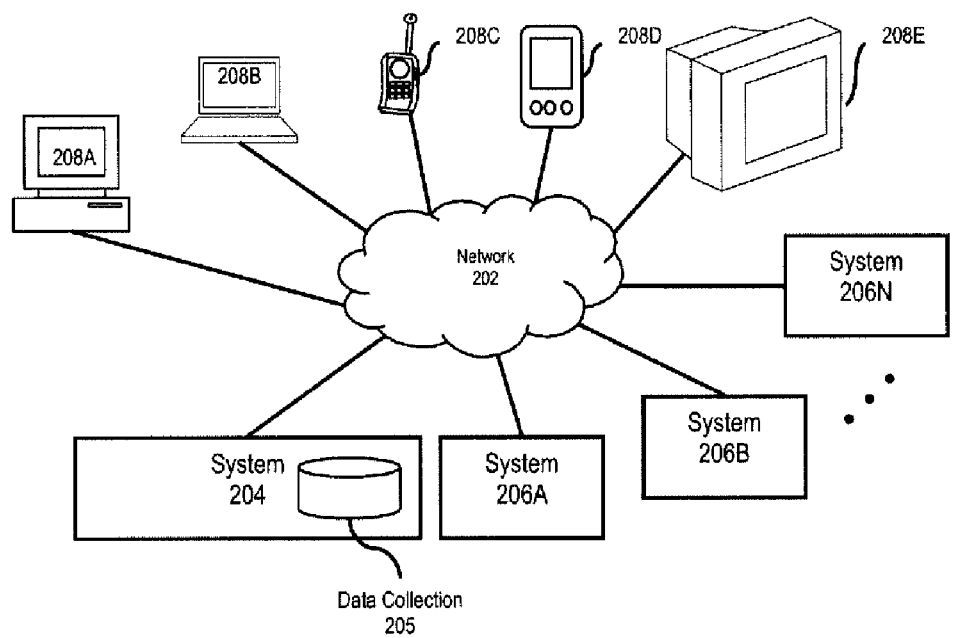
FIG. 2 illustrates an environment for associating and providing a previously associated navigation in accordance with one embodiment of the invention.

FIG. 2 illustrates an environment for associating and providing a previously associated navigation in accordance with one embodiment of the invention. In FIG. 2, several systems and devices are connected via network 202. One device, e.g. 208A, may request and navigate to and/or through documents stored on the other systems and devices, e.g. system 204.

Network 202 may be defined by a media, such as a land-based network, a wireless network, a satellite network or a combination thereof. Network 202 may also be defined by devices, such as a computer network, a telephone network, a cable television network, or a combination thereof. Network 202 may additionally be defined by a geographical connection range, such as a wide area network (WAN) (e.g. the Internet), a metropolitan area network (MAN) (e.g. a college campus network), a local area network (LAN) (e.g. an office building or household network), or a personal area network (PAN) (a wireless peripherals network). Network 202 interconnects systems 204, 206A-N and 208A-E.

System 204 may be a computing system that provides access to documents, e.g. web servers, file server or image servers. System 204, in particular, may include a search engine. System 204 may also include data collection 205. Data collection 205 may store keys and navigations associated with the keys, detailed further below. In certain embodiments, data collection 205 may be a database, a table within a database, an array, a table within a spreadsheet, a comma delineated list, a tab delineated list, or an extensible markup language (XML) file. Data collection 205 may also be external, but coupled, to system 204.

Systems 206A-N may also be a computing system that provides access to documents, e.g. web servers, file server or image servers. For example, while system 204 may serve search result documents to systems 208A-E, systems 206A-N may serve other documents, e.g. web pages, to systems 208A-E. Some search results served from system 204 may lead to documents stored on systems 206A-N.

Systems 208A-E access documents on systems 204 and 206A-N via network 202. Systems 208A-E include client systems such as personal computing systems 208A, mobile computing systems 208B, telephone systems 208C (e.g. mobile phones), wireless handheld devices 208D (e.g. personal digital assistants (PDAs)), television systems 208E, and the like. Other systems which may access documents on systems 204 and 206A-N (not shown) include dumb terminals, game consoles, set top boxes (e.g. digital cable boxes), and the like.

Figure 3A:
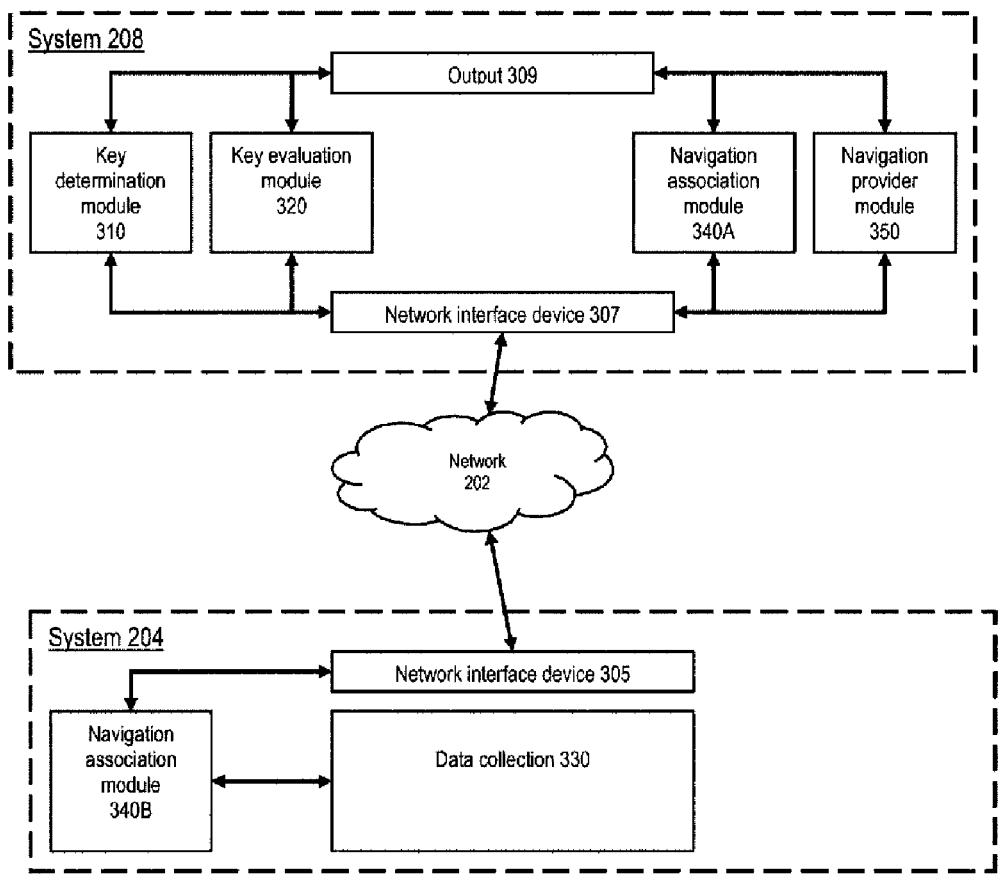
FIG. 3A illustrates a functional diagram of an environment in which viewed documents may be associated with a key in accordance with one embodiment of the invention.

FIG. 3A shows in more detail two of the systems interacting in FIG. 2. In particular, FIG. 3A illustrates a functional diagram of an environment in which viewed documents may be associated with a key in accordance with one embodiment of the invention. In FIG. 3A, system 208 includes output 309. In certain embodiments, output 309 includes a display for displaying documents to a user. The display may be, for example, a cathode ray tube (CRT) monitor, a liquid crystal display (LCD) monitor, a plasma display or a projector display. In other embodiments, output 309 includes other user interface output devices, including audio output devices.

System 208 also includes a network interface device 307 to receive and transmit data via network 202. Network interface device 307 may include a network interface card (NIC), modem, hub, router and/or other networking devices to allow system 208 to connect network 202.

System 208 also includes modules 310, 320, 340A and 350. Module 310 determines a key, e.g. the search key or document key previously described. Module 320 evaluates the key. This evaluation may include querying data collection 330 in system 204 to determine if the key currently exists in the data collection. Module 340A associates navigation sequences with the key.

For example, module 340A may determine the identifiers of documents displayed on output 309. Module 340A may also determine properties of the document, e.g. the document rank on a search results list. Module 340A may further determine properties of a user's interaction with the document, such as the time the document was displayed (display time), or the length of time the document is displayed (output dwell time).

Module 340A may transmit this information for storage to module 340B in system 204 through network interface device 305. In certain embodiments, module 340A may transmit this information presorted for storage in data collection 330. For example, the documents viewed may be sent presorted by dwell time.

In other embodiments, module 340A may transmit this information unsorted, and module 340B may determine the order and arrangement in which to sort and store the information in data collection 330. For example, document information may be sent as the documents are viewed, and module 340B may insert the information into a table in data collection 330 according to a certain field, such as dwell time, or a certain algorithm. Thus, data collection 330 may be stored pre-sorted for retrieval.

In yet other embodiments, document information may be stored unsorted and may be sorted during or after retrieval from the data collection. This retrieval may be performed by module 350 in system 208.

Module 350 in system 208 may determine that a key exists in data collection 330 and request the navigation associated with the key. Once the navigation is received, module 350 may activate or generate a user interface object on output 309, e.g. a button or menu, to provide the navigation to a user. Examples of such interfaces will be described in more detail with reference to FIGS. 8A-8H and FIG. 11. In certain embodiments, the interface may include hardware, such as one or more key(s) on a keyboard, a button on a mouse, a joystick, a microphone, or a dedicated hardware device, e.g. standalone hardware assigned to provide the navigation. The dedicated hardware device may include, for example, a special purpose add-in card. In other embodiments, activation of the interface includes activating hardware (e.g. via a hardware, software or firmware switch).

Figure 3B:
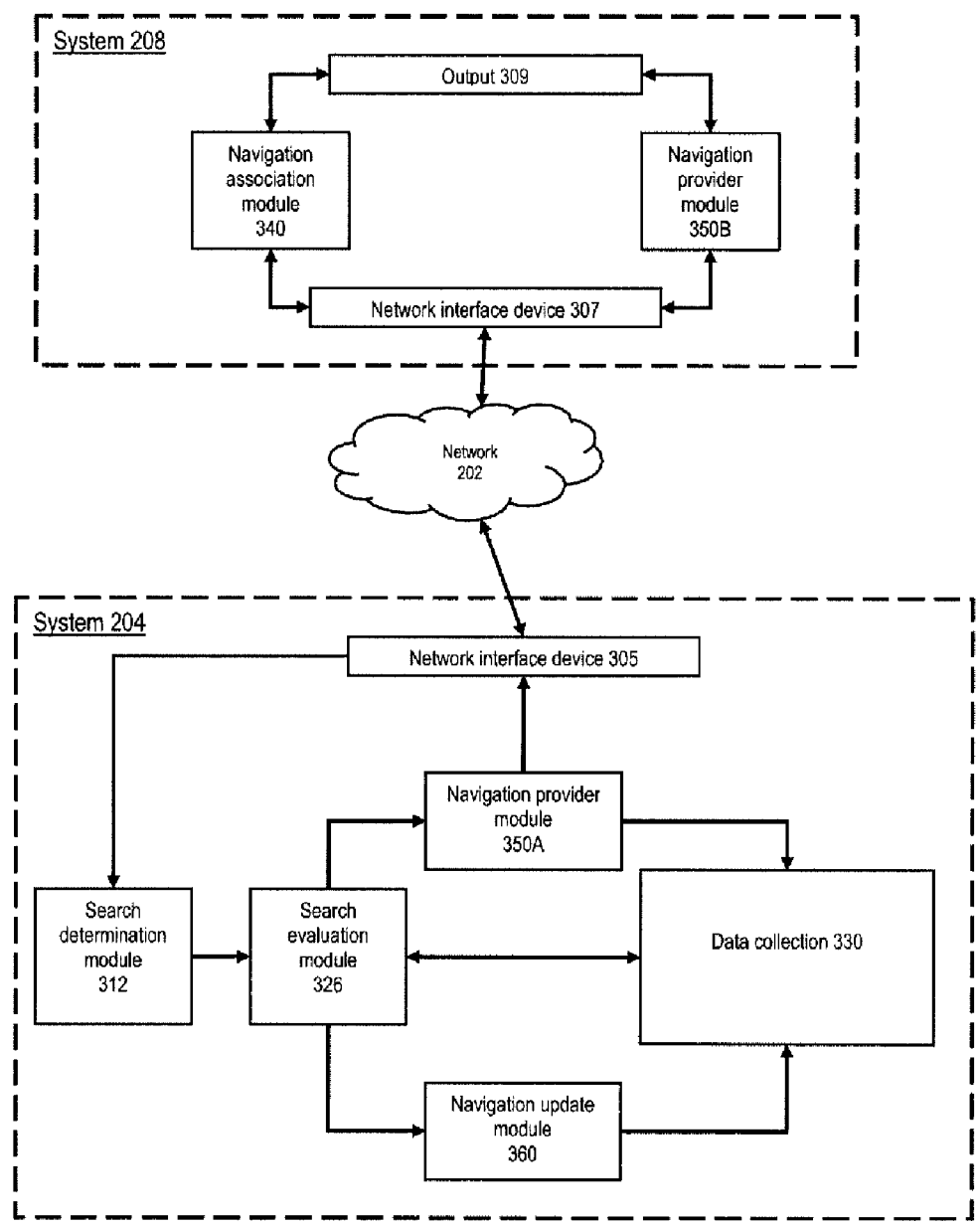
FIG. 3B illustrates a functional diagram of an environment in which viewed documents may be associated with a key in accordance with another embodiment of the invention.

FIG. 3B illustrates a functional diagram of an environment in which viewed documents may be associated with a key in accordance with another embodiment of the invention. In the embodiment of FIG. 3B, system 208 executes a search. This search is recognized by system 204 in module 312. For example, system 208 may enter search terms into a search engine in system 204 (not shown). These terms may be retrieved by search determination module 312. Alternatively, system 208 may receive search terms being sent to a separate system, which may be coupled or networked to system 204.

Module 312 may also perform processing to determine the search key from the search. For example, module 312 may parse the search query to remove terms such as "to" or "the." Module 312 then sends the search information to module 326 for evaluation.

Module 326 determines if the search key exists in data collection 330. Module 326 may also use the search key to determine if similar keys exist in the data collection. In certain embodiments, the similar key may relate semantically or conceptually to the search key. If the key or a similar key exists in data collection, module 326 may transmit this information to navigation provider module 350A.

Module 350A may then transmit the necessary information (e.g. a sequence of document identifiers in the associated navigation) to navigation provider module 350B in system 208. Module 350B may then activate or generate a user interface object (e.g. a button or menu) on output 309 as previously described.

If module 326 determines that the search key does not exist in data collection 330, it may execute instructions to store the new key in data collection 330. Then, when document information or a navigation sequence is received and to be associated with the key, the key will exist in data collection 330. The navigation may then be updated using module 360 to amend or replace the current (empty) navigation with new document information or a new document sequence.

Module 360 may also be used to prefix, append or otherwise integrate new document information or navigation sequence(s) to a currently stored navigation. The new document information or navigation sequence(s) may be provided by navigation association module 340 in system 208.

In certain embodiments, navigation association module 340 may transmit the document information, e.g. identifier, address, display time and/or dwell time, to system 204 as each document is viewed. In other embodiments, module 340 may transmit the document information in a navigation sequence, sorted or unsorted, as previously described. This sequence is stored in data collection 330.

In the embodiments shown in FIGS. 3A and 3B, data collection 330 is stored on a system separate from the system outputting (e.g. displaying) the tracked documents. These embodiments allow the navigation to be available across systems. For example, a user may navigate a set of documents on one system (e.g. a home computer) to arrive at a destination document. Storing the key and navigation on system 204 allows the user to use another system (e.g. a work computer) and have access to the associated navigation sequence.

Figure 4:
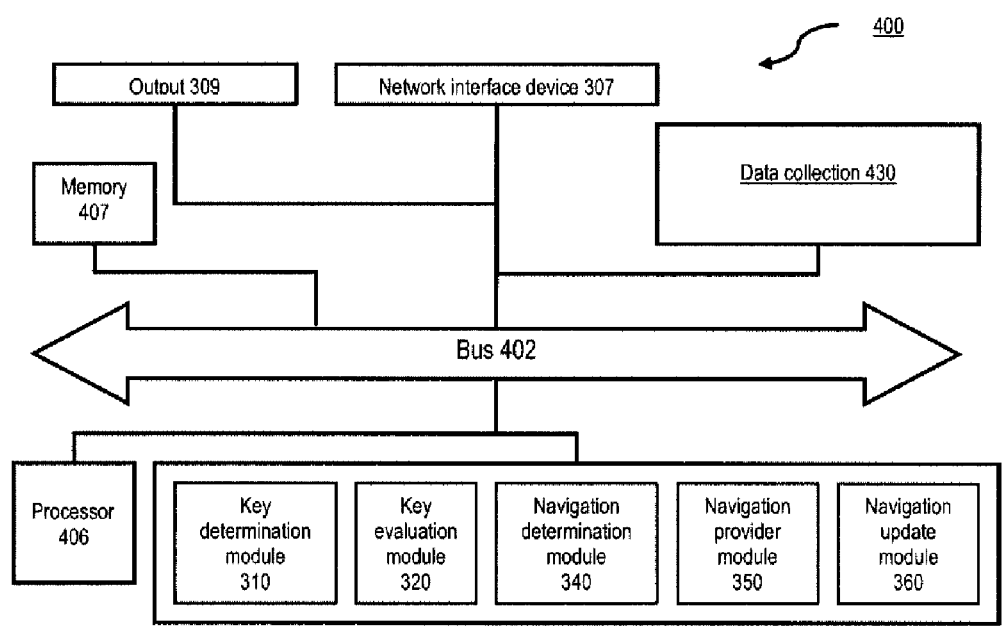
FIG. 4 illustrates a functional diagram of an environment in which viewed documents may be associated with a key in accordance with another embodiment of the invention.

FIG. 4 illustrates a functional diagram of an environment in which viewed documents may be associated with a key in accordance with another embodiment of the invention. In certain embodiments consistent with FIG. 4, a user of system 400 may request and navigate to and/or through documents stored on other external systems via network interface device 307. In other embodiments consistent with FIG. 4, a user of system 400 may request and navigate to and/or through documents stored locally in system 400, such as in memory 407. In either of these variations, however, the tasks of determining the key, evaluating the key, storing the key, determining the navigation, providing the navigation and updating the stored navigation are performed on the one system 400.

In FIG. 4, the modules performing the above tasks are interconnected by bus 402. Bus 402 carries electrical signals between components of system 400, such as signals from processor 406 to output 309. In certain embodiments, bus 402 is either a serial bus or a parallel bus. Bus 402 may also be an internal or external bus.

System 400 receives, via network interface device 307, documents to be outputted on output 309 (e.g. a monitor). In the embodiment shown in FIG. 4, key evaluation module 320 determines if a key is in data collection 430. Since data collection 430 is part of system 400, module 320 may determine if the key exists in data collection 430 by communicating with data collection 430 over bus 402, rather than over a network. Thus, in certain embodiments, communication with data collection 430 is independent of a network connection. This configuration allows privacy to be retained without implementing network security procedures.

Additionally, this configuration allows the stored navigation to be provided when a network connection may be unavailable or unnecessary. For example, in certain embodiments, viewed documents are stored in local memory (e.g. memory 407) rather than in external servers. Therefore, those embodiments may not have a network connection, or a network connection may be unnecessary. In such embodiments, when the key and associated navigation are also stored locally (e.g. in data collection 430), a user of system 400 may be provided with the associated navigation while unconnected to a network.

Processes

FIG. 5A illustrates a flow diagram associating viewed documents with a search key in accordance with one embodiment of the invention. In FIG. 5A, a search request is sent in block 502 to system 204. This search request may include keywords, Booleans and strings.

In certain embodiments, this search may be entered into a text input box. For example, the text input box may part of a web page or a toolbar. In certain embodiments, the toolbar may be part of a software program's graphical user interface (GUI) and may have one or more rows and/or columns of buttons or icons that, when selected, activate certain functions in the software program. The software program may be, for example, a web browser, a directory explorer, a document editing or viewing program, or the like. The toolbar may also be native to the software program or a third-party add-on extension, e.g. a Google® toolbar.

In certain embodiments, the search may be entered using non-graphical user interface module, such as an audio input device. In yet other embodiments, the search may entered by selecting a button to initiate a random search or a search having predetermined characteristics, e.g. a search for the most viewed document in the last 24 hours.

In certain embodiments, the search may be stored and/or tracked after logging into a service. For example, in certain embodiments, the service may be provided via a browser toolbar extension (e.g. a Google® toolbar). The user may log into service via a login button on the toolbar or via another program (e.g. an instant messenger program) that automatically logs the user into the toolbar service. The user may also log in to the service via a website with a username and password input box. Proper website login may then activate the service on the toolbar. The toolbar may then begin to store and/or track the searches using, for example, software objects maintained by the toolbar. In other embodiments, cookies may be used to store and/or track the searches. In other embodiments, an external server or database may be used. In certain embodiments, the navigation sequence(s) are also stored and/or tracked in a similar manner.

In response to the search request, a key is determined and evaluated in blocks 110 and 120. Depending on the result of the evaluation, the key may be stored in block 130 or a navigation previously associated with the key may be provided in block 150. The search request is received in block 504 by system 204, and the result of the search request is sent in block 506.

A request for a document A may be requested in block 512. For example, document A may be listed among other documents in the search result. A user may request document A by, for example, selecting a related link. This request may be sent to another system, e.g. system 206A.

In the embodiment of FIG. 5A, a document identifier (e.g. a document locator) is determined in response to the document request in block 141. This identifier is then associated with the key using methods as previously discussed. Thus, in this embodiment, document A may be associated with the key even if the request is not fulfilled, e.g. when system 206A is offline. This allows document A, which may be of interest but not currently available, to be associated with the key for later navigation. System 206A may receive the request and send document A in blocks 514 and 516.

After receiving document A in block 518, another document B may be requested from the same system 206A in block 522. For example, in embodiments in which system 206A is a web server, a user may want to view another page in the same website. In embodiments in which system 206A is a folder in a file system, the user may request to another file stored in the same folder. Again, a document identifier is determined in response to the document request, and the identifier is associated with the key. System 206A may receive the document B request in block 524 and transmit document B in block 526.

After receiving document B in block 528, a document C request may be sent to another system 206B. Again, a document identifier is determined in response to the document request, and the identifier is associated with the key. System 206B may receive the document C request in block 534 and transmit document C in block 536, which is received in block 538. The process may continue to repeat in such a manner.

In the embodiment shown in FIG. 5A, the navigation sequence associated with the key determined in block 110 and stored in block 130 may be in chronological order, i.e. "A, B, C." Alternatively, the navigation may be in reverse chronological order, i.e. "C, B, A." A sequence in reverse chronological order may allow a user to re-navigate to the last viewed document first (e.g. document C). In some cases, this last viewed document may be the desired destination document. In such embodiments, therefore, a user may re-navigate straight to a destination document, bypassing intermediate, and possibly less relevant, documents (e.g. documents A and B). In other embodiments, the navigation may be arranged by other metrics, e.g. dwell time, display time and/or a heuristic algorithm.

As previously suggested, the navigation (or navigation sequence) may be stored in a software object (e.g. a toolbar menu listing, array or table), a file (e.g. a cookie file, an extensible markup language (XML) file, comma-delineated text file or tab-delineated text file), a database, a server, or the like.

FIG. 5B illustrates a flow diagram associating viewed documents with a search key in accordance with another embodiment of the invention. In FIG. 5B, rather than determining the document identifier in response to a document request, the document identifier is determined in response to a document receipt. Therefore, when a request for document C is sent in block 532 and fails in block 540, document C is not associated with the key. This request fail may be caused by a system 206B failure or inadequate security privileges, for example.

In the embodiment of FIG. 5B, received documents are associated with the key. However, requested, but not received, documents are not associated with the key. The navigation sequence associated with the key in FIG. 5B therefore includes documents A and B, but not document C (e.g. "A, B" or "B, A"). Such a configuration allows the user to re-navigate through viewed documents without having to repeat failed attempts at viewing a particular document (e.g. via a broken link). In such embodiments, such failed navigation attempts would not be associated with the key. Therefore, the user would not re-navigate through those failed paths when using a navigation tool in accordance with embodiments of this invention.

Figure 6:
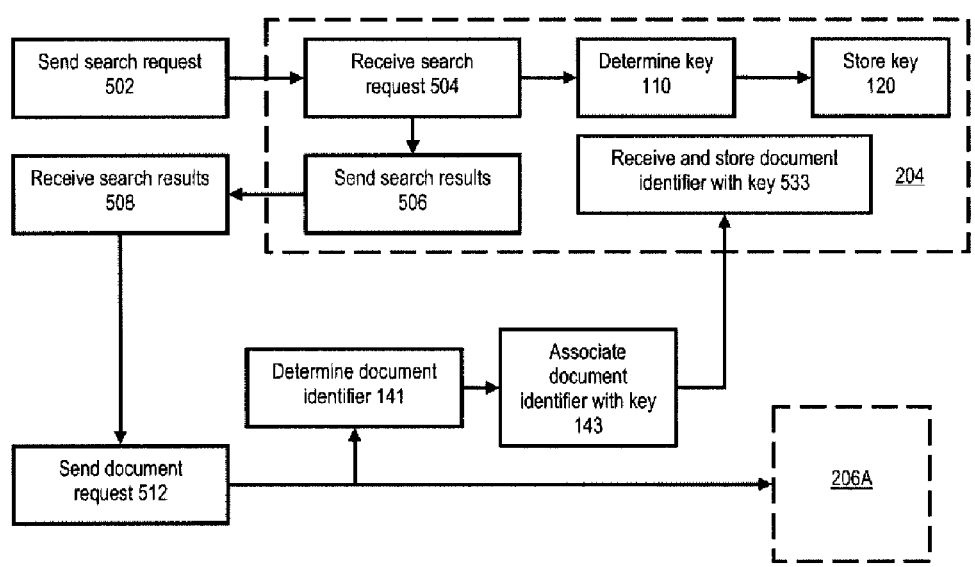
FIG. 6 illustrates a flow diagram associating viewed documents with a search key in accordance with another embodiment of the invention.

FIG. 6 illustrates a flow diagram associating viewed documents with a search key in accordance with another embodiment of the invention. The embodiment of FIG. 6 corresponds to configurations such as that shown in FIG. 3B. In FIG. 6, the key is not determined or stored until after a search request is received. Furthermore, the key is determined and stored in the system receiving the search request, i.e. system 204. Therefore, when a document is later associated with the key, such as in block 143, the document identifier, along with any other relevant information, is sent to system 204 for storage.

Figure 7:
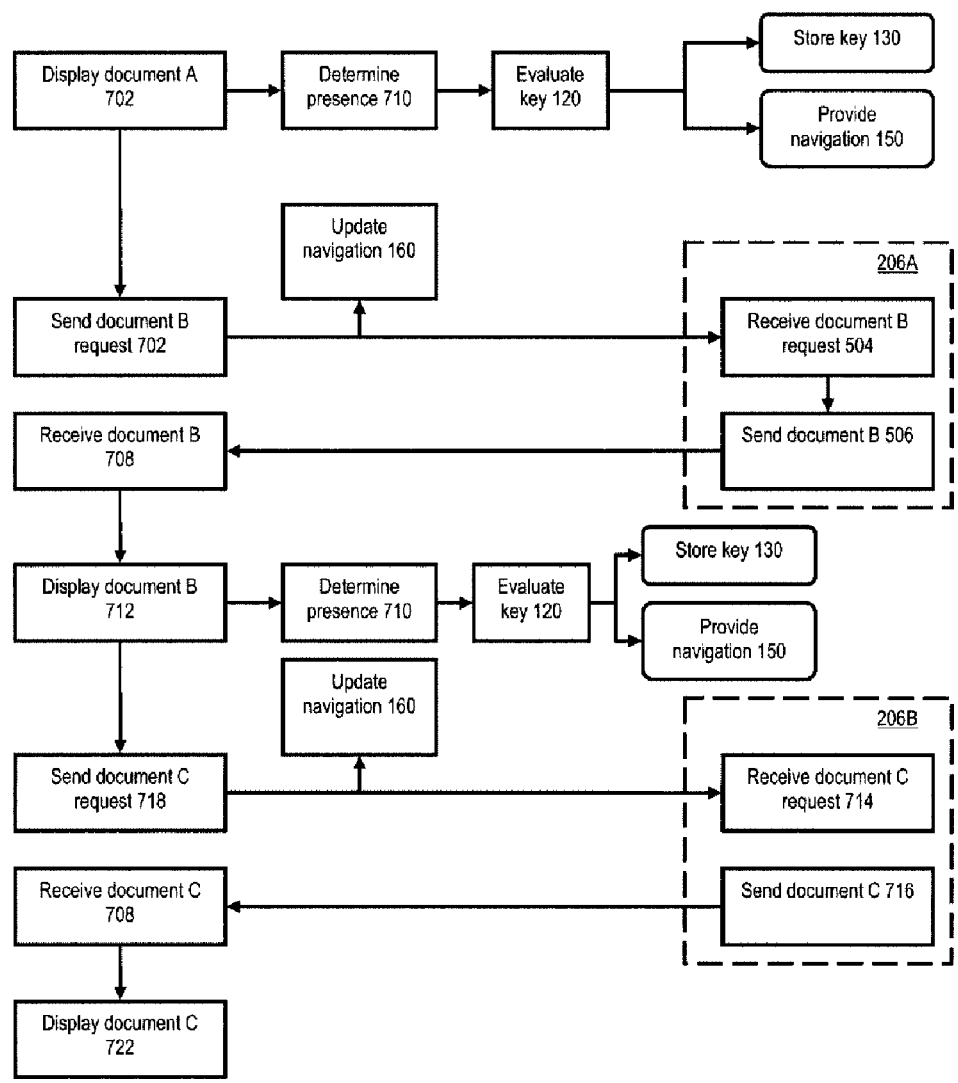
FIG. 7 illustrates a flow diagram associating viewed documents with a document key in accordance with one embodiment of the invention.

FIG. 7 illustrates a flow diagram associating viewed documents with a document key in accordance with one embodiment of the invention. In FIG. 7, the key is based upon a document displayed in block 702 (e.g. document A), rather than a search.

The presence of the document, or interaction with the document, is determined in block 710. This presence or interaction may be determined by detecting the display of a document and then examining a document property, e.g. an address. This presence may also be detected by examining properties of an application used to display the document. For example, in certain embodiments, a browser displays the document. The browser's address field may be examined to determine document presence. In other embodiments, presence or interaction with a document may include viewing a preview (e.g. thumbnail) of the document, such as in a file directory explorer window.

Determining document presence may include determining a document key simultaneously. For example, if a document address is used as a document key, then determining the document address when determining document presence may also determine the document key. In other embodiments, the document key may be determined after document presence is determined.

In block 120, the key is evaluated. Depending on the result of the evaluation, the key may be stored in block 130 or a navigation previously associated with the existing key may be provided in block 150.

In block 702, a request for another document B may be sent to system 206A. In response to the request, the navigation currently associated with the key may be updated in block 160 to reflect the requested navigation to document B. Again, as in the embodiment described in FIG. 5A, document A may be associated with the key even if the request is not fulfilled, e.g. when system 206A is offline. This allows document A, which may be of interest but not currently available, to be associated with the key for later navigation.

In other embodiments, similar to the embodiment in FIG. 5B, a document identifier may be determined in response to receipt of the document, rather than request of the document. Again, such a configuration allows the user to re-navigate through viewed documents, without having to repeat failed attempts at viewing certain documents.

After receiving document A in block 708, the document may be displayed in block 712. In response to the display, the presence of or interaction with the displayed document may again be determined in block 710, the key evaluated in block 120 and the key stored in block 130 and/or the navigation provided in block 150. This process may then repeat with a request for document C to system 206B. Therefore, the navigation associated with document A, in this embodiment, would include documents B and C.

EXAMPLES

FIGS. 8A-8H illustrate consecutive screen shots and tables representing the association of a search key with viewed documents in accordance with one embodiment of the invention.

Figure 8A:
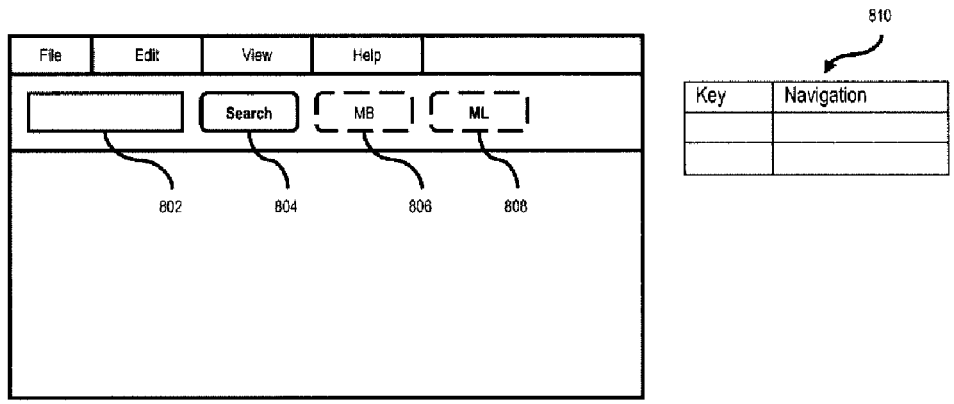
FIGS. 8A-8H illustrate consecutive screen shots and tables representing the association of a search key with viewed documents in accordance with one embodiment of the invention.

In FIG. 8A, an application includes a search input box 802, search button 804, and navigation tools 806 and 808. Navigation tool 806, labeled "MB" for memory button, may be repeatedly selected when activated. In FIG. 8A, tool 806 is not activated, as is represented by the dashed border. Navigation tool MB corresponds to a navigation keyed to search, rather than a document. Navigation tool 808, labeled "ML" for memory lane, also may be repeatedly selected when activated. Navigation tool ML corresponds to a navigation keyed to a document, rather than search. Additionally, FIG. 8A includes table 810 to represent a data collection used to associate a key with a navigation.

Figure 8B:
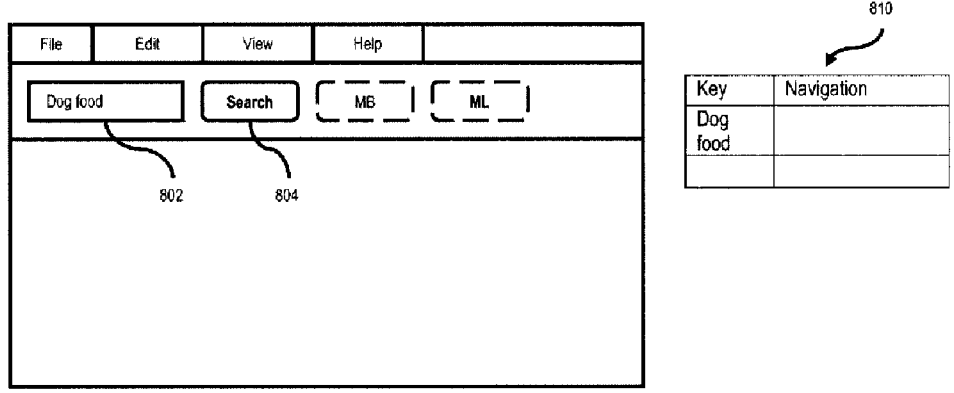
Figure 8C:
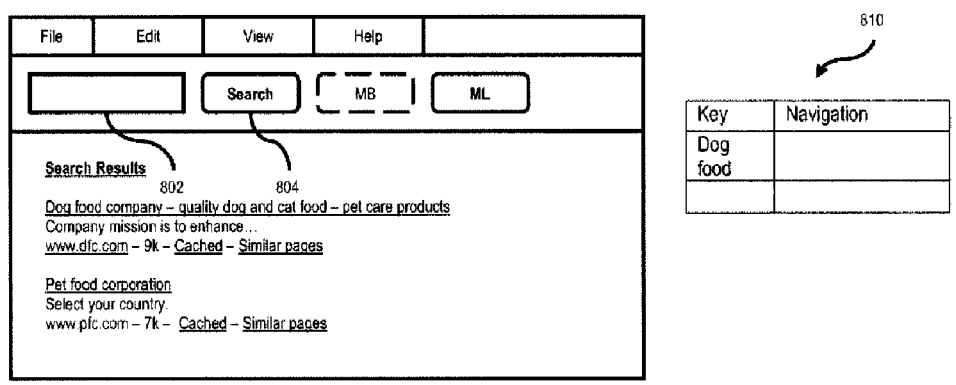

In FIG. 8B, a search for "Dog food" is entered into box 802. Selecting search button 804 results in FIG. 8C. In FIG. 8C, a document lists the results of the search, e.g. a list of possibly relevant documents which may contain information on dog food. Table 810 now contains the keywords "Dog food" in the key column. A request for the first document relating to the "Dog food company" may be sent. The request may be sent by clicking on the related underlined text, for example. Such a request may result in FIG. 8D.

Figure 8D:
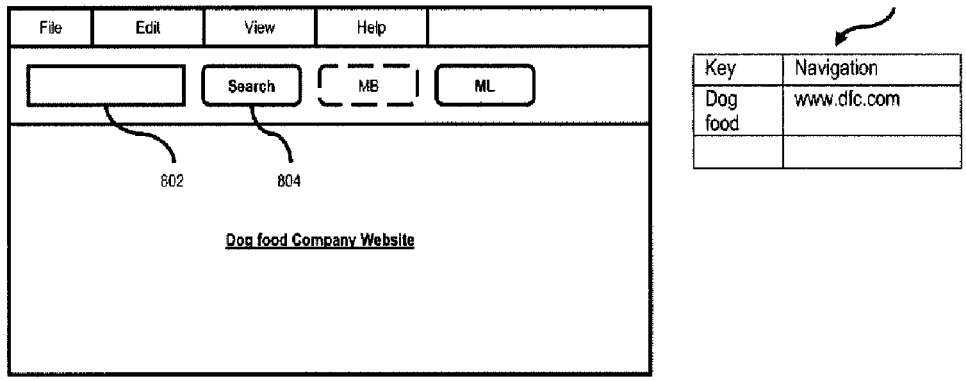
Figure 8E:
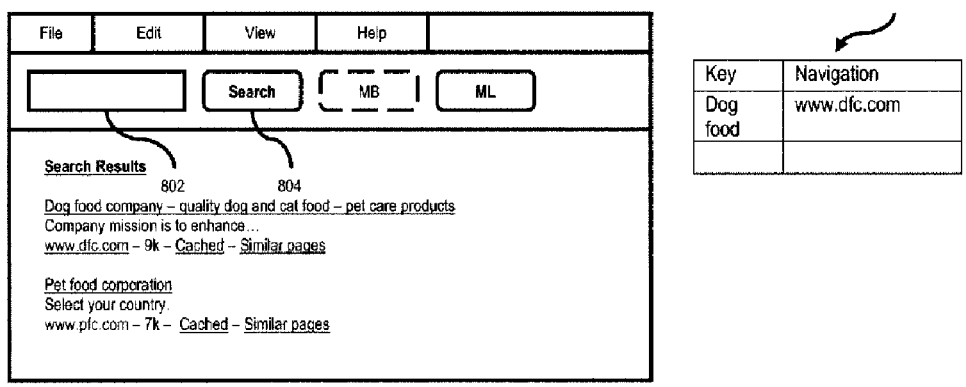
Figure 8F:
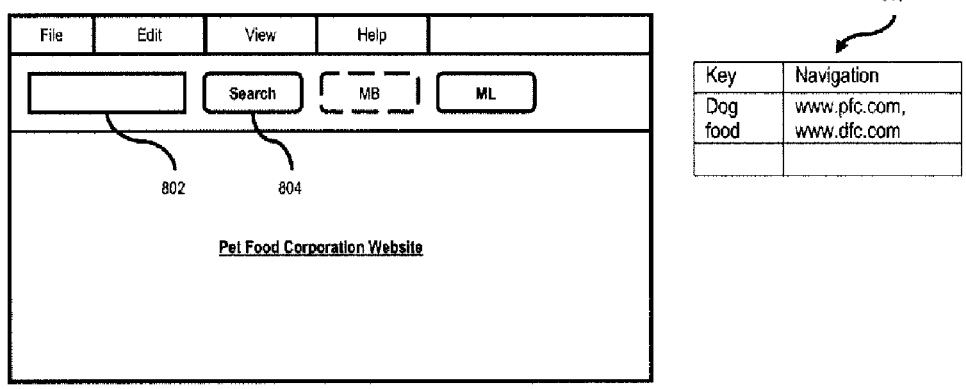

In FIG. 8D, a document is displayed. The document is associated with the locator "www.dfc.com," which is now associated with the key "Dog food" in table 810. If a user does not find the information relevant, the user may return to the previous search page, as shown in FIG. 8E. A request for the next document in the list relating to "Pet food corporation" may then be sent. Such a request may result in FIG. 8F. In FIG. 8F, a document associated with the locator "www.pfc.com" is displayed. The locator is now associated with the key "Dog food" in table 810.

Figure 8G:
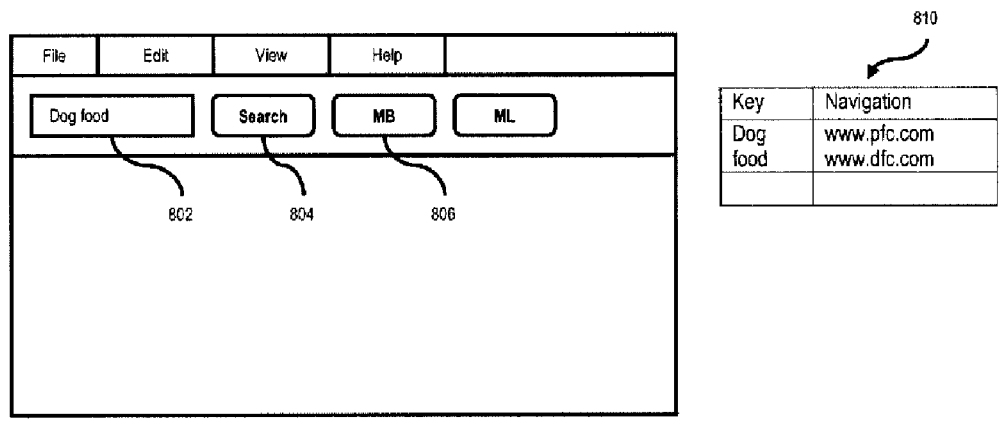

Subsequently, if the key "Dog food" is re-entered, the key will be associated with a navigation which includes the Pet food corporation and the Dog food company, as seen in FIG. 8G. In certain embodiments, the key may be re-entered by typing in the same or similar search terms into box 802 without selecting search button 804 to submit the search terms. In other embodiments, the key may be re-entered by typing in the same or similar search terms and selecting search button 804 to submit the terms to a search engine. Once the key is re-entered, the associated navigation may be provided by activating and selecting a button (e.g. MB button 806), shown in FIG. 8G by a solid border.

Figure 8H:
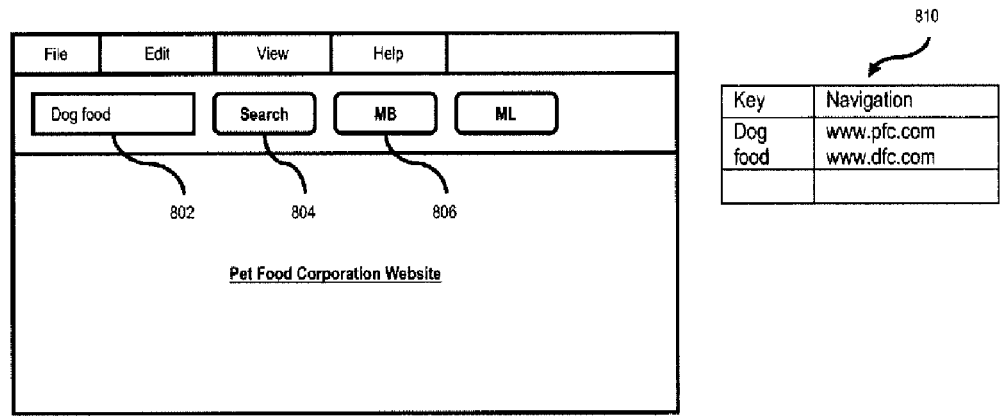

In FIG. 8H, selecting button 806 sends a request for the first document listed in the associated navigation. As shown in table 810 in FIG. 8H, the first document listed in the associated navigation is the Pet Food Corporation document, indicated by the identifier "www.pfc.com." This document is requested, received and displayed in FIG. 8H. Selecting the MB button again after the Pet Food Corporation document is displayed sends a request for the next document listed in the associated navigation, in this case, the Dog Food Company document.

Figure 9A:
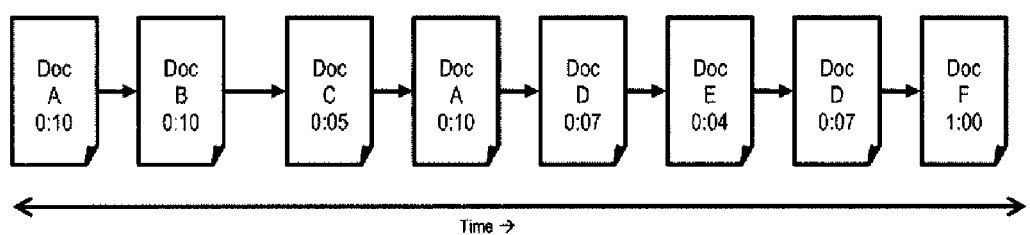
FIG. 9A illustrates a timeline of viewed documents in accordance with one embodiment of the invention.
Figure 9B:
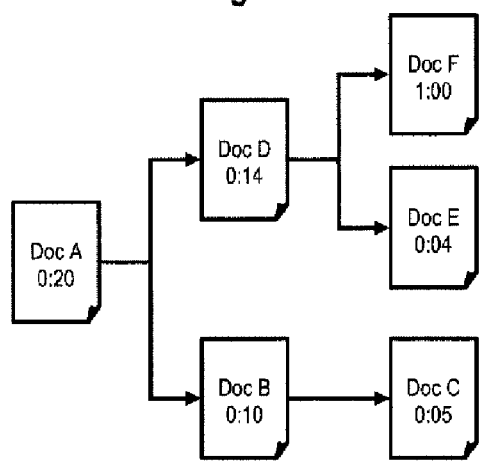
FIG. 9B illustrates a tree diagram of the documents of FIG. 9A in accordance with one embodiment of the invention.

FIGS. 9A and 9B illustrate a more complicated navigation. Specifically, FIG. 9A illustrates a timeline of viewed documents in accordance with one embodiment of the invention. In FIG. 9A, Doc A is viewed before Doc B, which is viewed before Doc C. Doc A is then viewed again. Then Doc D is viewed, and so on until Doc F is viewed.

A user may have executed a variety of actions to view the documents in this manner. For example, as shown in FIG. 9A, in navigating from Doc E to Doc F, the user first navigated back to Doc D. The user may have, for example, selected a "Back button" a keyboard or a browser toolbar, or selected a link in Doc E to return to Doc D. In navigating from Doc C to Doc A, however, the user did not first navigate to Doc B. The user may have, for example, selected Doc A from a "Back menu" or selected a link in Doc C to navigate back to Doc A. Thus, a user may have executed a variety of actions to navigate through the documents.

In the embodiment above, documents viewed as a result of actions which indicate that a user has switched tasks are not associated with navigation. For example, when actions such as typing a uniform resource locator (URL) into an address input box or selecting a saved bookmark indicate that a user is switching tasks, the document viewed as a result of such actions are not associated with the navigation. Such document may be associated with a new navigation, however.

In FIG. 9A, the length of time each document was displayed (dwell time) is also indicated. For example, Doc A was displayed for 10 seconds the first time. The second time, Doc A was also displayed for 10 seconds. Therefore, Doc A has a total dwell time of 20 seconds.

FIG. 9B illustrates a tree diagram of the documents of FIG. 9A in accordance with one embodiment of the invention. In FIG. 9B, the documents are navigated through in alphabetical order. Thus, Doc A is viewed before Doc B, which is viewed before Doc C. Doc C is viewed before Doc D, but Doc D is reached through Doc A. Therefore, from Doc C, the user views Doc A again before viewing Doc D, either though Doc B or bypassing Doc B. After Doc D is viewed, Doc E and then Doc F are viewed.

In FIG. 9B, the total dwell time on each document is shown. In one embodiment, the dwell time may be the total length of time a document is displayed or outputted. For example, it may be the total length of time between when Doc A is fully loaded and displayed in a browser window and when another document begins to load in the same browser window. In certain embodiments, the dwell time may exclude time periods when a window outputting the document is minimized or not actively viewed. For example, the total dwell time for Doc A is 20 seconds, corresponding to the sum of the dwell times shown in FIG. 9A. The total dwell time for Doc B is 10 seconds, for Doc C 5 seconds, and so on.

FIGS. 10A-10D illustrate tables listing various navigations associated with the documents of FIGS. 9A and 9B in accordance with various embodiment of the invention. In FIG. 10A, the navigation associated with Doc A is "D, F, E B, C." This navigation is ordered so as to take a user starting from the current document (Doc A), through the latest sequence of navigation (D and F). If a user continues to select the navigation tool (e.g. MB 806 or ML 808), the user may be taken to the next latest document in the sequence, bypassing those documents already seen in the navigation (e.g. Doc D). Another selection of the navigation tool takes the user through the next latest sequence of documents (e.g. Doc B then Doc C). In certain embodiments, the navigation tool may be selected by an event instead of, or in addition to, a user selection. For example, in certain embodiments, the navigation tool may be selected by opening a document related to a previous navigation, or completion of a related background task (e.g. a document download or upload or a software upgrade). Thus, the navigation of FIG. 10A is ordered by a combination of latest display time and sequence.

In FIG. 10B, the navigation associated with Doc A is "F, E, D, C, B." This navigation is ordered in reverse chronological order. In this embodiment, the chronologically ordered navigation (ABCADEDF) may be analyzed, repeated documents removed after the documents' initial listing (ABCDEF), and the order reversed. Therefore, in this embodiment, if a user starting from current Doc A selects the navigation tool, the user may be taken to the last viewed document (Doc F). If a user continues to select the navigation tool, the user may be directed to the next latest viewed document (e.g. E). In one embodiment, documents are not re-navigated through more than once using the tool. In other embodiments, a chronologically ordered navigation (ABCADEDF) may be analyzed, the current document removed (BCDEDF), previously listed documents removed if later listed (BCEDF), and then the order reversed (FDECB).

In FIG. 10C, Doc A is associated with a navigation ordered by dwell time, rather than by either reverse chronological order or a combination of latest display time and sequence. Thus, a user selecting a navigation tool (e.g. MB 806 or ML 808) will re-navigate first through the pages displayed for the longest length of time.

In FIG. 10D, Doc B is associated with a navigation ordered in yet another manner. As can be seen by comparison of the timeline of FIG. 9A to the navigation associated with Doc B, the documents are re-navigated in chronological order from the root document. Thus, from Doc B, the documents are re-navigated in the order "C, A, D, E, F," bypassing documents already listed in the navigation. In other embodiments, documents already listed maybe included in the navigation to fully reflect the previously navigation sequence. These and other navigation orders (e.g. by document rank or a heuristic algorithm), and variations and combinations thereof may be also used.

Figure 11:
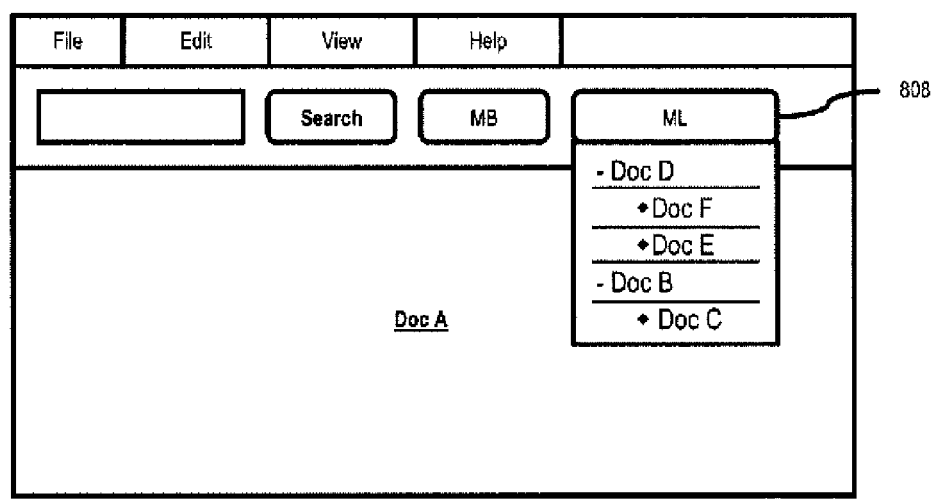
FIG. 11 illustrates a screen shot of a menu displaying a navigation associated with a document in accordance with one embodiment of the invention.

FIG. 11 illustrates a screen shot of a menu displaying a navigation associated with a document in accordance with one embodiment of the invention. In FIG. 11, the ML navigation tool 808 is a menu rather than a button. The menu displays the tree of FIG. 9B in different format. This menu format allows a user to view the various sequences in the associated navigation and to select the particular documents, rather than having the user re-navigate through a stored navigation sequentially.

CONCLUSION

Thus, a system and method for navigating previously viewed documents is disclosed. In the above detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail so as not to obscure the present invention.

Additionally, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings or may be acquired from practice of the invention. Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments.

Moreover, the use of the phrase "viewed documents" or the like includes documents viewed through senses other than the visual, such as audio senses. Thus, a document may be "viewed" through audio output devices as well as through visual output devices.

Reference to a document as used herein may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Reference to a server as used herein may include a software application that carries out tasks on behalf of users such as file serving, application serving, web serving, mail serving, email serving, image server, and the like. The term server as used herein may also include any physical device on which such software is executed, such as a mainframe, a minicomputer, a personal computer, a dedicated server machine, and the like.

Reference to a client as used herein may include any system that accesses a service on another system by some kind of network. These clients include, but are not limited to, systems referred to as terminals, personal computers, thin clients, personal digital assistants (PDAs), mobile telephones, pagers, wireless handheld devices, game consoles and televisions.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, magnetic optical disks, read only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or writing the media in question. Specialty apparatus may include a collection of readily available pieces or an application specific integrated circuit (ASIC) including a series of logic blocks, for example.

The displays presented herein are not inherently related to any particular computer or other apparatus. Various general purpose systems may be used with programs in accordance with the teachings herein or it may be convenient to construct more specialized apparatus to perform the required method. For example, any of the methods according to the present invention can be implemented in hard wired circuitry by programming a general purpose processor or by any combination of hardware and software.

It will be appreciated that the invention can be practiced with systems such as stand-alone computers, hand held devices, multi-processor systems, microprocessor based or programmable consumer electronics, network personal computers, mainframe computers and the like.

The method of the invention may be implemented using computer software. If written in a programming language conforming to a recognized standard sequence of instructions, the methods can be compiled for execution on a variety of hardware platforms or machines and for interface to a variety of operating systems. In addition the present invention is not described with reference to any particular programming language. It will be appreciated that a variety of programming languages may be used to implement the teachings of the invention as described herein.

What is claimed is:

1. A method performed by a client device, comprising:
receiving at the client device a first search key as an initial search query input;
submitting, to a search engine that stores one or more search keys and navigation information associated with each of the one or more search keys in a data collection, a first search request comprising the first search key from the client device;
receiving at the client device a first search results page comprising links to resources;
collecting navigation information at the client device, the navigation information identifying a plurality of the resources that are accessed by the client device through the search results page;
instructing the search engine to store the first search key as a new key in the data collection;
submitting to the search engine the collected navigation information for storage in association with the new key in the data collection;
receiving at the client device at a later time a second search key as a later search query input, where the second search key is identical to the first search key; and
displaying, in response to receipt of the second search key, one of the plurality of the resources identified in the navigation information, wherein the displayed resource is accessed by the client device for a longer length of time relative to other lengths of time in which other of the plurality of the resources are accessed by the client device.

2. The method of claim 1, wherein the first search key and the second search key are each part or all of a query.

3. The method of claim 1, further comprising:
determining that the second search key is stored in the data collection; and
selecting the navigation information stored in association with the first search key in the data collection, as a consequence of determining that the second search key is stored in the data collection.

4. The method of claim 1, wherein collecting the navigation information further comprises collecting a length of time that a resource in the plurality of the resources is displayed in a user interface window of the client device.

5. The method of claim 4, wherein the length of time that the resource from the plurality of the resources is displayed in the user interface window of the client device excludes one or more periods of time when the user interface window displaying the resource is minimized or not active.

6. The method of claim 1, further comprising:
determining that the second search key is identical to the first search key; and
activating a control after determining that the second search key is identical to the first search key and before requesting any search by the search engine of the second search key.

7. The method of claim 6, further comprising one or more of:
displaying an earliest visited of the plurality of the resources in response to an initial user selection of the activated control; and
displaying a next-to-earliest visited of the plurality of the resources in response to a subsequent user selection of the activated control.

8. The method of claim 6, further comprising one or more of:
displaying a last visited of the plurality of the resources in response to an initial user selection of the activated control; and
displaying a next-to-last visited of the plurality of the resources in response to a subsequent user selection of the activated control.

9. The method of claim 6, wherein displaying the one of the plurality of the resources comprises one or more of:
   displaying one of the plurality of the resources accessed for a longest length of time in response to an initial user selection of the activated control; and
   displaying one of the plurality of the resources accessed for a next-to-longest length of time in response to a subsequent user selection of the activated control.

10. The method of claim 6, wherein the control comprises a menu with user-selectable regions;
   wherein a user-selectable region displays one of the plurality of the resources for selection by a user of the client device.

11. The method of claim 1, further comprising:
   sorting the navigation information,
   wherein the sorted navigation information is displayed.

12. The method of claim 1, further comprising:
   determining whether the data collection stores information indicative of the first search key.

13. The method of claim 1, wherein the client device comprises a first client device, and wherein:
   the first search request is submitted to the search engine from the first client device, and the second search key is received at the later time at a second, different client device.

14. The method of claim 1, wherein the plurality of the resources comprises first resources visited by a user of the client device, and wherein:
   the navigation information further identifies second resources selected by the user of the client device.

15. The method of claim 1, wherein the first search key comprises one or more search terms, and wherein the second search key is identical to the first search key when one or more search terms of the second search key comprise same search terms as the one or more search terms of the first search key.

16. The method of claim 1, wherein displaying comprises:
   displaying the one of the plurality of the resources before requesting a search by the search engine of the second search key.

17. A client device comprising:
   a computer-readable storage medium configured to store instructions which are executable by one or more processors to perform operations comprising:
      receiving at the client device a first search key as an initial search query input;
      submitting, to a search engine that stores one or more search keys and navigation information associated with each of the one or more search keys in a data collection, a first search request comprising the first search key from the client device;
      receiving at the client device a search results page comprising links to resources;
      collecting navigation information at the client device, the navigation information identifying a plurality of the resources that are accessed by the client device through the first search results page;
      instructing the search engine to store the first search key as a new key in the data collection;
      submitting to the search engine the collected navigation information for storage in association with the new key in the data collection;
      receiving at the client device at a later time a second search key as a later search query input, where the second search key is identical to the first search key; and
      displaying, in response to receipt of the second search key, one of the plurality of the resources identified in the navigation information, wherein the displayed resource is accessed by the client device for a longer length of time relative to other lengths of time in which other of the plurality of the resources are accessed by the client device.

18. The client device of claim 17, wherein the first search key and the second search key are each part or all of a query.

19. The client device of claim 17, wherein the operations further comprise:
   determining that the second search key is stored in the data collection; and
   selecting the navigation information stored in association with the first search key in the data collection, as a consequence of determining that the second search key is stored in the data collection.

20. The client device of claim 17, wherein collecting the navigation information further comprises collecting a length of time that a resource in the plurality of the resources is displayed in a user interface window of the client device.

21. The client device of claim 20, wherein the length of time that the resource from the plurality of the resources is displayed in the user interface window of the client device excludes one or more periods of time when the user interface window displaying the resource is minimized or not active.

22. The client device of claim 17, wherein the operations further comprise:
   determining that the second search key is identical to the first search key; and
   activating a control after determining that the second search key is identical to the first search key and before requesting any search by the search engine of the second search key.

23. The client device of claim 22, wherein the operations further comprise one or more of:
   displaying an earliest visited of the plurality of the resources in response to an initial user selection of the activated control; and
   displaying a next-to-earliest visited of the plurality of the resources in response to a subsequent user selection of the activated control.

24. The client device of claim 22, wherein the operations further comprise one or more of:
   displaying a last visited of the plurality of the resources in response to an initial user selection of the activated control; and
   displaying a next-to-last visited of the plurality of the resources in response to a subsequent user selection of the activated control.

25. The client device of claim 22, wherein displaying the one of the plurality of the resources comprises one or more of:
   displaying one of the plurality of the resources accessed for a longest length of time in response to an initial user selection of the activated control; and
   displaying one of the plurality of the resources accessed for a next-to-longest length of time in response to a subsequent user selection of the activated control.

26. The client device of claim 22, wherein the control comprises a menu with user-selectable regions;
   wherein a user-selectable region displays one of the plurality of the resources for selection by a user of the client device.

27. The client device of claim 17, wherein the operations further comprise:
   sorting the navigation information,
   wherein the sorted navigation information is displayed.

28. The client device of claim 17, wherein the operations further comprise:

determining whether the data collection stores information indicative of the first search key.

29. The client device of claim 17, wherein the client device comprises a first client device, and wherein:
the first search request is submitted to the search engine from the first client device, and the second search key is received at the later time at a second, different client device.

30. The client device of claim 17, wherein the plurality of the resources comprises first resources visited by a user of the client device, and wherein:
the navigation information further identifies second resources selected by the user of the client device.

31. A computer-readable storage medium configured to store instructions that are executable by one or more processors of a client device to perform operations comprising:
receiving at the client device a first search key as an initial search query input;
submitting, to a search engine that stores one or more search keys and navigation information associated with each of the one or more search keys in a data collection, a first search request comprising the first search key from the client device;
receiving at the client device a first search results page comprising links to resources;
collecting navigation information at the client device, the navigation information identifying a plurality of the resources that are accessed by the client device through the search results page;
instructing the search engine to store the first search key as a new key in the data collection;
submitting to the search engine the collected navigation information for storage in association with the new key in the data collection;
receiving at the client device at a later time a second search key as a later search query input, where the second search key is identical to the first search key; and
displaying, in response to receipt of the second search key, one of the plurality of the resources identified in the navigation information, wherein the displayed resource is accessed by the client device for a longer length of time relative to other lengths of time in which other of the plurality of the resources are accessed by the client device.

32. The computer-readable storage medium of claim 31, wherein the first search key and the second search key are each part or all of a query.

33. The computer-readable storage medium of claim 31, wherein the operations further comprise:
determining that the second search key is stored in the data collection; and
selecting the navigation information stored in association with the first search key in the data collection, as a consequence of determining that the second search key is stored in the data collection.

34. The computer-readable storage medium of claim 31, wherein collecting the navigation information further comprises collecting a length of time that a resource in the plurality of the resources is displayed in a user interface window of the client device.

35. The computer-readable storage medium of claim 34, wherein the length of time that the resource from the plurality of the resources is displayed in the user interface window of the client device excludes one or more periods of time when the user interface window displaying the resource is minimized or not active.

36. The computer-readable storage medium of claim 31, wherein the operations further comprise:
determining that the second search key is identical to the first search key; and
activating a control after determining that the second search key is identical to the first search key and before requesting any search by the search engine of the second search key.

37. The computer-readable storage medium of claim 36, wherein the operations further comprise one or more of:
displaying an earliest visited of the plurality of the resources in response to an initial user selection of the activated control; and
displaying a next-to-earliest visited of the plurality of the resources in response to a subsequent user selection of the activated control.

38. The computer-readable storage medium of claim 36, wherein the operations further comprise one or more of:
displaying a last visited of the plurality of the resources in response to an initial user selection of the activated control; and
displaying a next-to-last visited of the plurality of the resources in response to a subsequent user selection of the activated control.

39. The computer-readable storage medium of claim 36, wherein displaying one of the plurality of the resources comprises one or more of:
displaying one of the plurality of the resources accessed for a longest length of time in response to an initial user selection of the activated control; and
displaying one of the plurality of the resources accessed for a next-to-longest length of time in response to a subsequent user selection of the activated control.

40. The computer-readable storage medium of claim 36, wherein the control comprises a menu with user-selectable regions;
wherein a user-selectable region displays one of the plurality of the resources for selection by a user of the client device.

41. The computer-readable storage medium of claim 31, wherein the operations further comprise:
sorting the navigation information,
wherein the sorted navigation information is displayed.

42. The computer-readable storage medium of claim 31, wherein the operations further comprise:
determining whether the data collection stores information indicative of the first search key.

43. The computer-readable storage medium of claim 31, wherein the client device comprises a first client device, and wherein:
the first search request is submitted to the search engine from a first client device, and
the second search key is received at the later time at a second, different client device.

44. The computer-readable storage medium of claim 31, wherein the plurality of the resources comprises first resources visited by a user of the client device, and wherein:
the navigation information further identifies second resources selected by the user of the client device.

* * * * *

UNITED STATES PATENT AND TRADEMARK OFFICE
CERTIFICATE OF CORRECTION

Page 1 of 1

PATENT NO.        : 8,131,736 B1
APPLICATION NO.   : 12/324267
DATED             : March 6, 2012
INVENTOR(S)       : Bay-Wei Chang and Eric Fredricksen It is certified that error appears in the above-identified patent and that said Letters Patent is hereby corrected as shown below:

Col. 13, Line 66, In Claim 1, after "device a" delete "first".

Col. 15, Line 56, In Claim 17, after "through the" delete "first".

Col. 17, Line 17, In Claim 31, after "device a" delete "first".

Signed and Sealed this
Twenty-ninth Day of May, 2012

David J. Kappos
*Director of the United States Patent and Trademark Office*